(12) United States Patent
Lin (10) Patent No.: US 11,397,593 B1
(45) Date of Patent: Jul. 26, 2022

(54) LOADABLE BIOS PRESET CONFIGURATIONS

(71) Applicant: QUANTA COMPUTER INC., Taoyuan (TW)

(72) Inventor: Yen-Ting Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/207,154

(22) Filed: Mar. 19, 2021

(51) Int. Cl.
G06F 9/44 (2018.01)
G06F 9/445 (2018.01)
G06F 9/4401 (2018.01)

(52) U.S. Cl.
CPC ........ G06F 9/44505 (2013.01); G06F 9/4401 (2013.01)

(58) Field of Classification Search
CPC .................. G06F 1/32; G06F 1/12; G06F 9/44
See application file for complete search history.

(56) References Cited

U.S. PATENT DOCUMENTS

| | | | |
|---|---|---|---|
| 10,853,179 B2 | 12/2020 | Montero et al. | |
| 2004/0088534 A1* | 5/2004 | Smith | G06F 13/385 713/1 |
| 2004/0227911 A1* | 11/2004 | Salvatori | H04N 21/4112 348/E5.103 |
| 2007/0169076 A1* | 7/2007 | Desselle | G06F 8/65 717/168 |
| 2019/0026126 A1* | 1/2019 | Liu | G06F 9/44505 |
| 2021/0182080 A1* | 6/2021 | Guo | G06F 9/44505 |
| 2021/0240484 A1* | 8/2021 | Vidyadhara | G06F 21/64 |

FOREIGN PATENT DOCUMENTS

| | | |
|---|---|---|
| TW | 200617773 A | 6/2006 |
| TW | 200834384 A | 8/2008 |
| TW | 200951812 A | 12/2009 |
| TW | 201342236 A | 10/2013 |
| TW | 202111521 A | 3/2021 |

OTHER PUBLICATIONS

TW Office Action for Application No. 110135225, dated Mar. 2, 2022, w/ First Office Action Summary.
TW Search Report for Application No. 110135225, dated Mar. 2, 2022, w/ First Office Action.

* cited by examiner

Primary Examiner — Keshab R Pandey
(74) Attorney, Agent, or Firm — Nixon Peabody LLP (57) ABSTRACT

Loadable BIOS preset configurations are disclosed, permitting large numbers of BIOS settings to be quickly implemented through the use of hot-keys. In an in-band process, the BIOS can be updated locally by pressing a hot-key to load a preset configuration of BIOS settings. The preset configuration can be stored by accessing a BIOS setup utility, selecting updated BIOS settings, and assigning a hot-key. In an out-of-band process, a system's BIOS can be updated remotely by sending a hot-key selection to use in a subsequent boot-up via a Future BIOS Settings variable, then sending the configuration information as a UEFI variable. When the remote computer next boots, the Future BIOS Settings variable will be used to simulate a hot-key selection that will cause the system to apply the configuration information in the UEFI variable.

12 Claims, 8 Drawing Sheets

LOADABLE BIOS PRESET CONFIGURATIONS

TECHNICAL FIELD

The present disclosure relates to computer systems generally, and more specifically to operating BIOS firmware.

BACKGROUND

Computing systems often make use of BIOS (Basic Input/Output System) firmware to handle various initialization processes when a system is booting up. In many personal computers, the BIOS settings may rarely or never need to be changed. However, in certain environments, it can be important to be able to change the settings of the BIOS. For example, when debugging or performing maintenance on a computing system, it may be helpful to change the computing system's boot order by adjusting the corresponding BIOS setting, thus allowing an operator to boot the computing system using a different operating system.

Currently, adjusting BIOS settings is a time-consuming process, and can be difficult to perform remotely. Current techniques for adjusting BIOS settings involves opening a BIOS setup utility while the computing system is booting up; manually selecting and updating each BIOS setting desired to be updated; then saving the updated BIOS settings and rebooting the computing system. If the previous BIOS settings are desired to be re-used, the user may need to write them down for later reference. When the user wishes to revert to the previous BIOS settings, the user would need to open the BIOS setup utility again as the computing system boots up a subsequent time, manually select and update each BIOS setting to match the settings previously written down, then save the BIOS settings and reboot the computing system again.

There is a need for improved techniques for making adjustments to BIOS settings.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method. The method includes beginning booting of a computing system having a BIOS firmware. The BIOS firmware has a current configuration based on multiple BIOS settings. The method further includes receiving a hot-key selection and accessing custom configuration information associated with the hot-key selection. The custom configuration information includes one or more updated settings. An updated setting can include a value to use to update a particular BIOS setting. Each of the one or more updated settings can be associated with a respective one of the plurality of BIOS settings. The method can further include applying each of the one or more updated settings to achieve an updated configuration for the BIOS firmware. The method can further include continuing booting of the computing system using the BIOS firmware and the updated configuration.

In some cases, the one or more updating settings includes multiple updated settings. In some cases, receiving the hot-key selection includes receiving the hot-key selection from a local peripheral device coupled to the computing system. In some cases, receiving the hot-key selection includes receiving a Future BIOS Settings variable through a network interface of the computing system, and receiving the hot-key selection from the Future BIOS Settings variable.

In some cases, accessing the custom configuration information includes accessing the custom configuration information from a local storage of the computing system that is accessible by the BIOS firmware. In some cases, accessing the custom configuration information includes receiving a Unified Extensible Firmware Interface (UEFI) variable through a network interface of the computing system, and extracting the custom configuration information from the UEFI variable.

Embodiments of the present disclosure include a computer-implemented method. The method includes receiving current configuration information for a BIOS firmware associated with a computing device. The current configuration information is based on multiple BIOS settings. The method further includes displaying the plurality of BIOS settings using the current configuration information. The method further includes receiving user input indicative of one or more updated settings and a hot-key selection. Each of the one or more updated settings is associated with a respective one of the plurality of BIOS settings. The method further includes generating and storing custom configuration information usable to apply the one or more updated settings when the hot-key selection is received by the computing device.

In some cases, the method further comprises opening a BIOS setup utility on the computing system. Displaying the plurality of BIOS settings occurs in the BIOS setup utility, storing the custom configuration information includes storing the custom configuration information in a memory accessible by the BIOS firmware. In some cases, the method further comprises presenting a prompt indicating the one or more updated settings and the hot-key selection. In some cases, the method includes receiving a confirmation in response to presentation of the prompt, wherein generating and storing the custom configuration information occurs in response to receiving the confirmation.

In some cases, receiving the BIOS current configuration includes receiving the BIOS current configuration via a network interface. Displaying the plurality of BIOS settings includes displaying the plurality of BIOS settings on an additional computing device (e.g., an additional computing device communicatively coupled to the computing device via the network interface). Receiving user input occurs on the additional computing device. Storing the custom configuration includes transmitting the custom configuration information to the computing device. The method further comprises transmitting the hot-key selection to the computing device.

In some cases, generating and storing the custom configuration information includes generating BIOS configuration instructions. In some cases, transmitting the custom configuration information to the computing device includes setting a Unified Extensible Firmware Interface (UEFI) variable associated with the computing device using the BIOS configuration instructions. In some cases, transmitting the hot-key selection includes setting a Future BIOS Settings variable using the hot-key selection. In some cases, the method further includes transmitting a reboot signal. When received by the computing device, the reboot signal initiates a reboot of the computing device.

In some cases, the method further includes initiating a connection with a baseboard management controller (BMC) of the computing device using the network interface. In such cases, transmitting the custom configuration information includes transmitting the custom configuration information to the BMC. Also, transmitting the hot-key selection includes transmitting the hot-key selection to the BMC.

Embodiments of the present disclosure include a computing system comprising one or more data processors and a non-transitory computer-readable storage medium containing instructions. When executed on the one or more data processors, the instructions cause the one or more data processors to perform any one or combination of the aforementioned method(s).

Embodiments of the present disclosure include a computer-program product tangibly embodied in a non-transitory machine-readable storage medium, including instructions configured to cause a computing system to perform any one or combination of the aforementioned method(s).

Additional features and advantages of the disclosure will be set forth in the description that follows, and will in part, be obvious from the description; or can be learned by the practice of the principles set forth herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

The specification makes reference to the following appended figures, in which use of like reference numerals in different figures is intended to illustrate like or analogous components.

The present disclosure is susceptible to various modifications and alternative forms. Some representative embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the disclosure as defined by the appended claims.

DETAILED DESCRIPTION

The present disclosure can be embodied in many different forms. Representative embodiments are shown in the drawings, and will herein be described in detail. These embodiments are examples or illustrations of the principles of the disclosure but are not intended to limit its broad aspects. For purposes of the present detailed description, unless specifically disclaimed and as appropriate, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances of," or any logical combination thereof.

Certain aspects and features of the present disclosure relate to loadable BIOS preset configurations, which permit large numbers of BIOS settings to be quickly implemented through the use of hot-keys. In an in-band process, the BIOS can be updated locally by pressing a hot-key to load a preset configuration of BIOS settings. The preset configuration can be stored by accessing a BIOS setup utility, selecting updated BIOS settings, and assigning a hot-key. In an out-of-band process, a computing system's BIOS can be updated remotely by sending a hot-key selection to use in a subsequent boot-up via a Future BIOS Settings variable, and then sending the configuration information as a Unified Extensible Firmware Interface (UEFI) variable. When the remote computer next boots, the Future BIOS Settings variable will be used to simulate a hot-key selection that will cause the system to apply the configuration information in the UEFI variable.

As used herein, the term BIOS is inclusive of any firmware used to boot up a computing system. Thus, the term BIOS is intended to be inclusive of a UEFI firmware used to boot up a computing system.

When booting up a computing system, such as a personal computer or a computer server, often one of the first processes performed includes loading BIOS firmware. This firmware can assist the computing system in performing a Power On Self-Test (POST), initializing hardware and detecting peripherals, and searching for and loading a boot-loader that can be used to load a kernel and an operating system. These various processes can be performed using BIOS firmware that is stored locally in memory of the computing system, such as on some form of read-only memory like an EPROM (erasable programmable read-only memory).

BIOS firmware can be configurable, such as through the use of a BIOS setup utility. When first booting up a computing system, the BIOS setup utility can often be initiated by holding down a particular key on an attached keyboard peripheral. Once in the BIOS setup utility, certain configurable BIOS settings can be adjusted and saved to a BIOS-accessible memory, such as a battery-backed RAM (random access memory) or NVRAM (non-volatile RAM).

Various BIOS settings can be adjusted, depending on user needs. For example, in some cases the boot order may need to be changed to accommodate testing or maintenance being performed on the computing system. Examples of commonly adjusted BIOS settings include boot order, central processing unit (CPU) settings (e.g., CPU frequency), memory settings, fast boot settings, trusted platform module (TPM) settings, peripheral settings, bus settings (e.g., universal serial bus (USB) settings, SATA (Serial ATA) settings, and the like), display settings, power management settings, wake-on-LAN (local area network) settings, other system-specific settings. In some cases, other settings may need to be adjusted.

In some cases, multiple settings may need to be adjusted at a time. Whenever the settings are adjusted, they can be saved and the computing system can be rebooted to have the BIOS firmware boot up using the new BIOS settings. When multiple settings are to be adjusted at a time, however, it can take substantial time and effort by the user to ensure all of the settings are correctly updated. If these tasks are performed repeatedly, there is an increased chance for human error to occur, resulting in incorrect settings that can delay use (e.g., delay maintenance, testing, or standard use of the computing system) or even damage components of the computing system.

Certain aspects and features of the present disclosure allow for preset configurations of BIOS settings to be stored and recalled quickly and easily. These preset configurations can be pre-stored (e.g., stored during manufacture of the computing system or when the computing system is initially set up) or can be established as needed (e.g., stored when a user performs maintenance, testing, or other use of the computing system). Each preset configurations can be a collection of one or more BIOS settings. In some cases, a preset configuration can be set as a default configuration. Each preset configuration can be associated with a particular hot-key, such that when a hot-key selection is made, the preset configuration can be recalled.

According to certain aspects of the present disclosure, the computing system can receive a hot-key selection during boot-up. The hot-key selection can be matched to its associated preset configuration, which can be accessed and used to update the BIOS's current configuration. In some cases, the computing system can directly continue to boot using the new BIOS configuration, or can be automatically rebooted to boot up anew using the new BIOS configuration.

The BIOS can be updated using preset configurations in either an in-band (IB) process or an out-of-band (OOB) process. The D3 process can be performed using a directly coupled peripheral device, such as a keyboard. The OOB process can be performed using a remote computing system. Thus, the D3 process can be beneficial when the user is located at the computing system, whereas the OOB process can be used to still update many BIOS settings when the user is not located at the computing system.

Various techniques disclosed herein describe the ability to implement a custom configuration for a computing system's BIOS settings during a particular boot-up of the computing system. In general, this custom configuration will continue to be used until modified, such as by a subsequent hot-key selection or other alteration to the BIOS settings.

In some cases, however, the system can be set up to automatically revert to the configuration as it existed prior to application of the custom configuration. In such cases, the existing configuration can be stored in memory when the custom configuration is applied. Then, upon a subsequent boot after a boot using the custom configuration, the existing configuration can be automatically applied.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1:
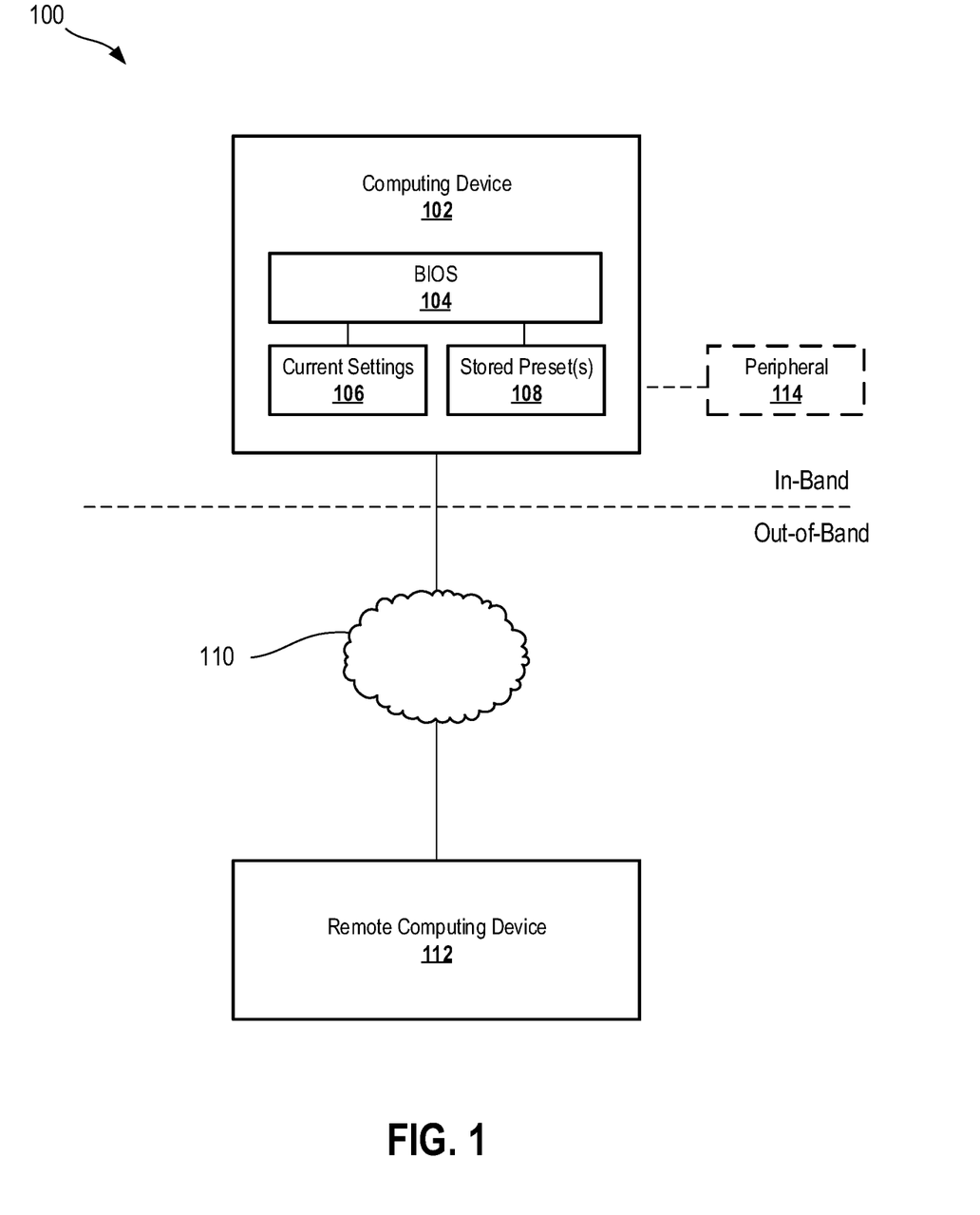
FIG. 1 is a schematic diagram depicting a computing environment for updating a BIOS, according to certain aspects of the present disclosure.

FIG. 1 is a schematic diagram depicting a computing environment 100 for updating a BIOS 104 in a computing device 102, according to certain aspects of the present disclosure. Computing device 102 can be any suitable computing device that makes use of the BIOS 104, such as a personal computer or a datacenter server. The BIOS 104 can be any suitable firmware for booting up the computing device 102, such as UEFI firmware or a legacy BIOS firmware. The BIOS 104 can access memory containing current settings 106 and stored preset(s) 108.

The BIOS 104 can include a number of BIOS settings, or variables that can be changed to adjust how the BIOS 104 operates and how the BIOS 104 boots up the computing device 102. A collection of values for any given set of BIOS settings can be known as a configuration. Therefore, the current settings 106 can be known as a configuration. In some cases, such as when the current settings 106 are each set to established default values, the current settings 106 can be known as a default configuration.

At least some of the BIOS settings can be user-configurable. Traditionally, user-configurable BIOS settings can be configured by entering a BIOS setup utility and selecting new values for the user-configurable BIOS settings. When saving the new values, the current settings 106 will be updated with the newly selected values.

Stored preset(s) 108 can contain one or more preset configurations for the BIOS 104. In some cases, some or all of the stored preset(s) 108 can be pre-defined, such as during manufacture of the computing device 102. In some cases, some or all of the stored preset(s) 108 can be user-configurable. In some cases, the computing device 102 may contain no stored preset(s) 108 until the user first creates one.

Upon booting of computing device 102, when the appropriate hot-key selection is received, the BIOS 104 can access, from the stored preset(s) 108, the preset configuration associated with the hot-key selection, and then update the current settings 106 based on the accessed preset configuration.

In some implementations, the stored preset(s) 108 can be stored and/or accessed using In-Band (IB) techniques. In such cases, a user can interact with the computing device 102 via a peripheral device 114, such as a keyboard or other input device.

In some implementations, the stored preset(s) 108 can be stored and/or accessed using Out-of-Band (OOB) techniques. In such cases, a user may interact with the computing device 102 through a remote computing device 112 via a network 110. In some cases, the computing device 102 that is booted using the BIOS 104 can be known as a "host computing device" or simply a "computing device," whereas the remote computing device 112 can be known as a "remote computing device." When OOB techniques are used, a network interface of the computing device 102 may be used. The remote computing device 112 can be any suitable computing device, such as a computer, tablet, server, or the like. The network 110 can be any suitable network, such as a local area network, a wide area network, a cloud network, or the Internet. In some cases, when OOB techniques are being used, the computing device 102 is coupled to peripheral 114, although that need not always be the case. For example, in some cases, computing device 102 can be a headless server that is not coupled to any keyboard or similar local input device. In such an example, the OOB technique can nevertheless be used to update the current settings 106 of the BIOS 104.

For illustrative purposes, the computing environment 100 is depicted with a dashed line separating an "In-Band" region and an "Out-of-Band" region to indicate that the D3 techniques can be performed locally at the computing device 102 and the OOB techniques can be performed remotely via the network 110.

Figure 2:
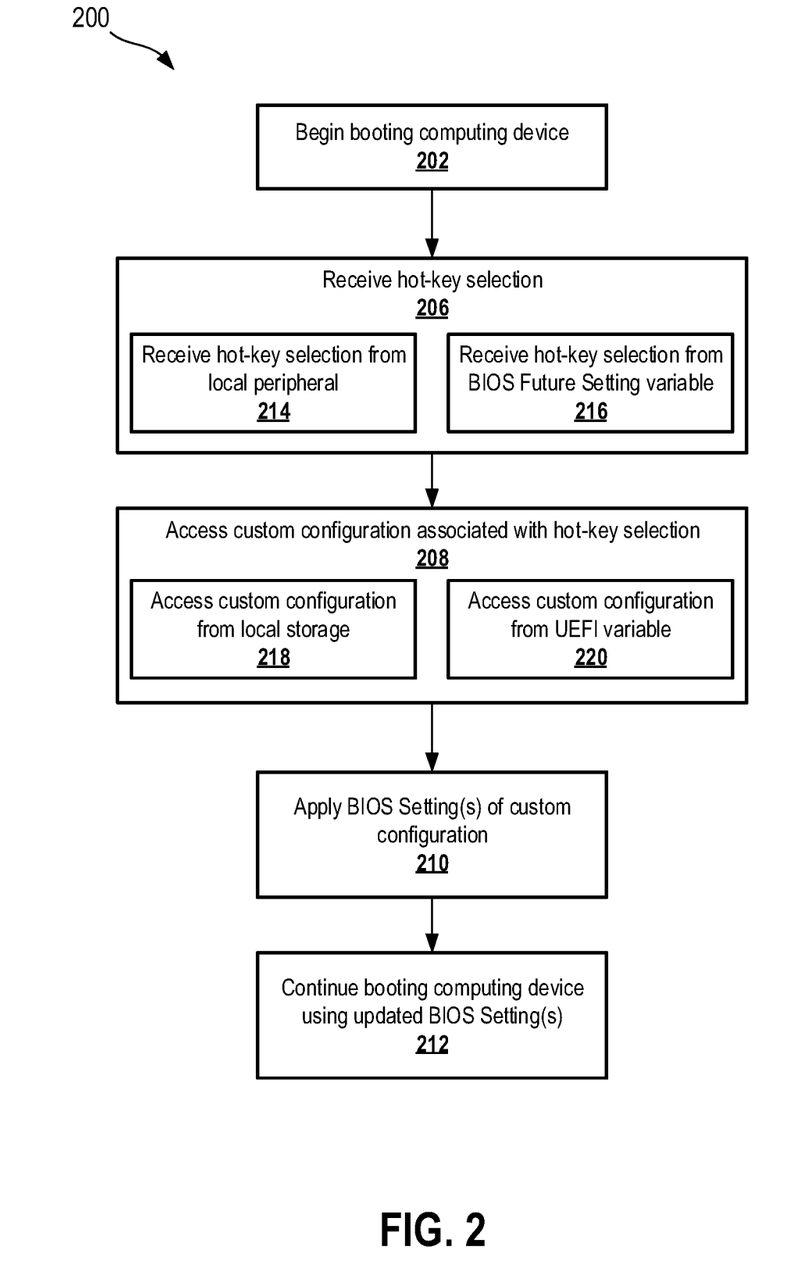
FIG. 2 is a flowchart depicting a process for applying a preset configuration of BIOS settings, according to certain aspects of the present disclosure.

FIG. 2 is a flowchart depicting a process 200 for applying a preset configuration of BIOS settings, according to certain aspects of the present disclosure. Process 200 can be performed using any suitable computing device or set of computing devices, such as the computing device 102 of FIG. 1.

At block 202, the computing system can begin booting. Beginning booting can include supplying power to the computing system, supplying power to one or more processors of the computing system, and beginning to execute BIOS firmware.

At block 206, a hot-key selection can be received. Receiving the hot-key selection can occur in different forms, depending on whether or not D3 or OOB techniques are being used.

When D3 techniques are being used, receiving the hot-key selection can include receiving the hot-key selection from a local peripheral device at block 214. The local peripheral device may be a keyboard or other such input device, such as the peripheral device 114 in FIG. 1. The peripheral device can be considered local if it is directly coupled to the computing device (e.g., plugged directly into the computing device or plugged into the computing device via a peripheral hub or peripheral switcher, such as a KVM (keyboard, video, and mouse) switch).

Receiving the hot-key selection from the local peripheral device at block 214 can occur at any suitable time during the boot-up process. In some cases, the hot-key selection can occur in some of the initial steps as the BIOS is booting the system. In such cases, by holding down a specific key during boot-up, an alternate set of BIOS settings (e.g., an alternate BIOS configuration associated with the held down hot-key) can be automatically loaded and used by the BIOS as the BIOS boots up the computing device. In other cases, the hot-key selection may occur only within a BIOS setup utility. In such cases, after entering the BIOS setup utility, pressing the hot-key can cause the desired set of BIOS settings to be automatically loaded. In some cases, automatically loading the desired set of BIOS settings in the BIOS setup utility can include saving the settings and rebooting the computing device, although that need not always be the case.

When OOB techniques are being used, receiving the hot-key selection can include receiving the hot-key selection from a BIOS Future Setting variable at block 216. The BIOS Future Setting variable can be received over a network connection using a network interface that has been already implemented by the BIOS. The BIOS Future Setting variable can be accessed by the BIOS and used to update a single BIOS setting. According to certain aspects of the present disclosure, the BIOS Future Setting variable can be used to pass a hot-key selection to the BIOS, thus permitting the BIOS to load as if a physical key were being depressed on an attached keyboard.

In some cases, the BIOS Future Setting can be provided by a baseboard management controller (BMC) or other controller of the computing device. The BMC can facilitate remote management of the computing device through industry standard protocols, such as Redfish. The Redfish protocol can provide a RESTful (e.g., Representational State Transfer (REST) compliant) application programming interface (API) that allows a remote computing device (e.g., remote computing device 112 of FIG. 1) to send a BIOS Future Setting to the computing device. Through a standard hypertext transfer protocol (HTTP) POST, PUT, or PATCH request, a BIOS Future Setting variable, such as a hot-key selection, can be passed to the BIOS.

In some cases, a BIOS Future Setting cannot be changed while the computing device is booting or at least during certain stages of booting. Therefore, in some cases, the hot-key selection can be received by the BMC in the form of an API command to update the BIOS Future Setting, after which the computing device can be rebooted, thus allowing the BIOS to receive the hot-key selection from the BIOS Future Setting upon the subsequent boot-up procedure.

Regardless of whether D3 or OOB techniques are used, the received hot-key selection can be used to access a custom configuration that is associated with the received hot-key selection at block 208. The custom configuration can include updated value(s) for one or more BIOS settings, although in some cases, the custom configuration can include updated values for at least two or more BIOS settings. In some cases, when only a single custom configuration is used, receiving the hot-key selection can cause the BIOS to access the only available custom configuration. In some cases, when multiple custom configurations are available, receiving the hot-key selection can cause the BIOS to identify the select custom configuration that is associated with the particular key of the hot-key selection.

When D3 techniques are being used, accessing the custom configuration can include accessing the custom configuration from local storage at block 218. Local storage (e.g., a BIOS-accessible memory) can contain one or more custom configurations. Each custom configuration can be associated with a hot-key. In some cases, each custom configuration is associated with a unique hot-key. At block 218, the BIOS can access the local storage and identify the custom configuration that is associated with the hot-key selection.

When OOB techniques are being used, accessing the custom configuration can include accessing the custom configuration from a UEFI variable at block 220. In such cases, a UEFI variable that was previously received by the computing device (e.g., prior to the current boot-up procedure), such as received by the BMC or otherwise, can contain the custom configuration. In some cases, the UEFI variable can include a single custom configuration and that UEFI variable can be associated with the particular key of the hot-key selection. Thus, the hot-key selection can be used to access the desired UEFI variable, which can then be read to obtain the custom configuration. In some cases, the UEFI variable can contain multiple custom configurations, each associated with a unique hot-key. Thus, the hot-key selection can be used to access a particular custom configuration within the UEFI variable.

Regardless of whether D3 or OOB techniques are used, the custom configuration can be applied to the BIOS setting(s) at block 210. Applying the custom configuration to the BIOS setting(s) can include using each of the BIOS setting values in the custom configuration to update the current settings of the BIOS, such as described herein.

At block 212, the computing device can continue booting using the updated BIOS setting(s). Thus, the computing device can boot using the selected custom configuration.

Figure 3:
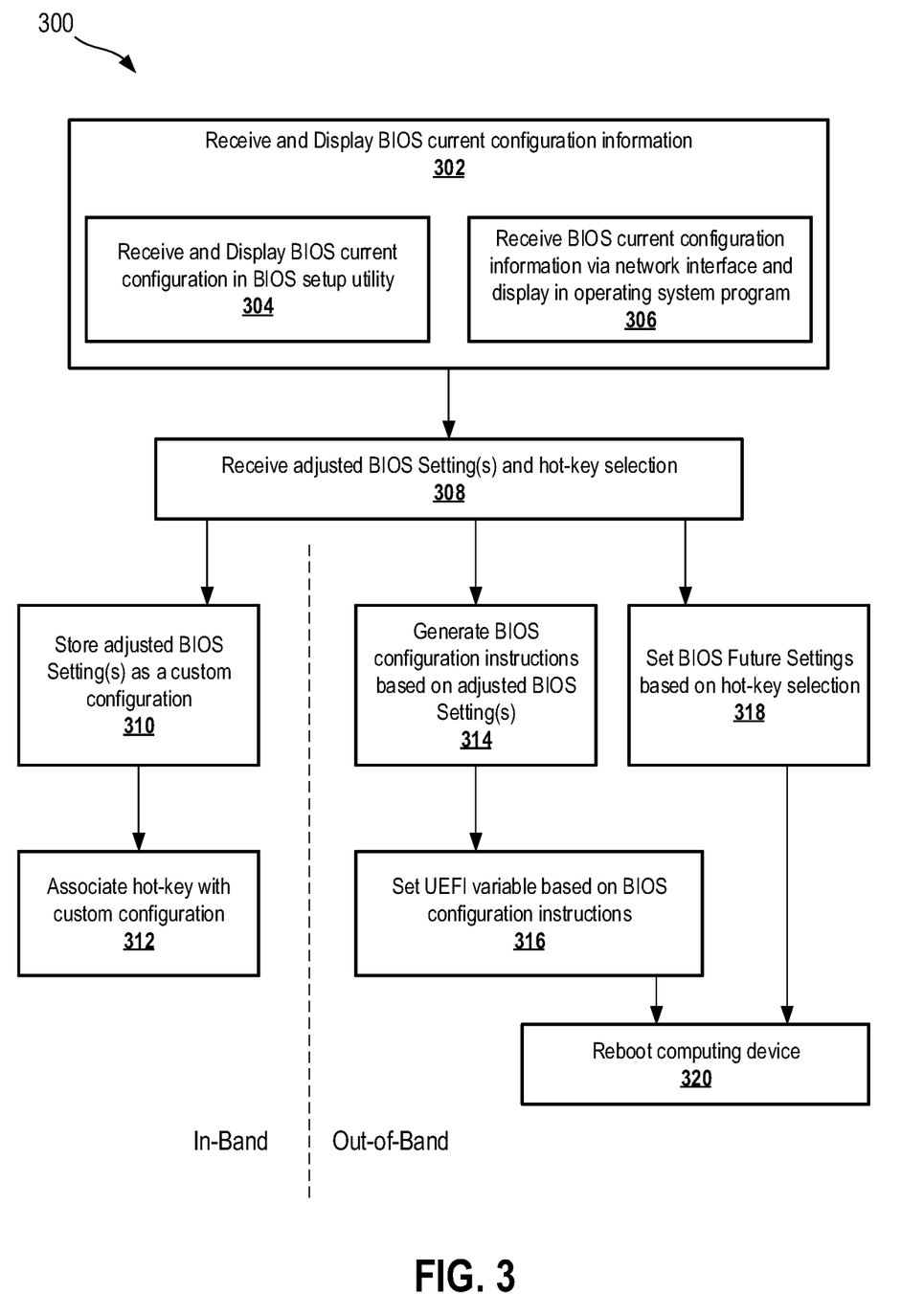
FIG. 3 is a flowchart depicting a process for generating preset configurations of BIOS settings and hot-key assignments, according to certain aspects of the present disclosure.

FIG. 3 is a flowchart depicting a process 300 for generating preset configurations of BIOS settings and hot-key assignments, according to certain aspects of the present disclosure. Process 300 can be performed by any suitable computing system, such as computing device 102 or remote computing device 112 of FIG. 1.

At block 302, the BIOS's current configuration information can be received and displayed. The current configuration information can include information about the available BIOS settings and/or current values for one or more of the BIOS settings.

When D3 techniques are used, receiving and displaying the current configuration information can include receiving and displaying the BIOS's current configuration (e.g., current values for BIOS settings) in a BIOS setup utility at block 304. The BIOS setup utility can be any suitable program designed to edit BIOS settings that can be run locally on the computing system on which the BIOS settings are used. Often, the BIOS setup utility is a program that can be run during early stages of boot-up, such as prior to loading of the computing device's operating system. Receiving and displaying the current configuration can include receiving values for certain BIOS settings and displaying the values in the BIOS setup utility. The user can then select and edit BIOS settings, as desired.

When OOB techniques are used, receiving and displaying the current configuration information can include receiving the current configuration information via a network interface and displaying the current configuration information in an operating system program at block 306. In such cases, the remote computing system can receive the current configuration information for the computing device from the computing device via a network interface of the remote computing device. In an example, the computing device may be fully booted-up and currently running, in which case a query to the computing device from the remote computing device can result in the computing device accessing its BIOS's current configuration information and transmitting the current configuration information to the remote computing device. In another example, the computing device may or may not be fully booted-up, in which case the query to the computing device from the remote computing device can be in the form of an API call (e.g., to the host computing device's BMC) to access the BIOS Attribute Registry. The resultant information can be displayed on the remote computing device.

In some cases, receiving the BIOS current configuration information at block 306 can include receiving information about the possible BIOS settings associated with the current configuration without necessarily receiving the current values of the BIOS settings. For example, instead of receiving the current value for the first boot option setting, the remote computing device may receive an indication that the first boot option is a BIOS setting and may receive an indication for its possible values (e.g., an enumerated list of possible values). For example, when accessing the BIOS Attribute Registry, the remote computing device can receive information only about the possible BIOS settings of the BIOS, rather than the actual current values for each of the BIOS settings. In other cases, however, receiving the BIOS current configuration information can include receiving the current values for one or more BIOS settings.

The display of the current configuration information on the remote computing device can include displaying the current configuration information within an application running in an operating system of the remote computing device.

Regardless of whether IB or OOB techniques are used, adjusted BIOS settings(s) and a hot-key selection can be received at block 308. When D3 techniques are being used, receiving adjusted BIOS setting(s) can occur by the user making adjustments to the values for certain BIOS settings via the BIOS setup utility. In such cases, the hot-key selection can be made in any suitable form, such as by selecting a hot-key to use from a drop-down list, by depressing the desired hot-key in response to a prompt, or the like. When OOB techniques are being used, receiving adjusted BIOS setting(s) can occur by the user making adjustments to the values for certain BIOS settings via the application running on the remote computing device that also displays the current configuration. In such cases, a user can make a hot-key selection in the same application, such as by selecting a hot-key to use from a drop-down list, by depressing the desired hot-key in response to a prompt, or the like.

When D3 techniques are used, the process 300 can continue by storing the adjusted BIOS setting(s) as a custom configuration at block 310 and associating the hot-key with the custom configuration at block 312. The storing at block 310 and/or association at block 312 can occur in BIOS-accessible storage.

When OOB techniques are used, process 300 can continue by generating BIOS configuration instructions based on the adjusted BIOS setting(s) at block 314. The configuration instructions can include any suitable information usable by the computing device to update the BIOS setting(s) based on the adjusted BIOS setting(s) from block 308. In an example, the BIOS configuration instructions can include an updated value for each BIOS setting in a list of BIOS setting(s). In another example, the BIOS configuration instructions can include code that, when executed on the computing device, causes the current configuration of the BIOS to be updated with the adjusted BIOS setting(s) from block 308.

At block 316, a UEFI variable can be set based on the BIOS configuration instructions. Setting the UEFI variable can occur as described herein, such as by making a POST or PUT request on an API of the computing device. In some cases, the UEFI variable can be otherwise transmitted to or set on the host computing device.

In addition to blocks 314 and 316, process 300 can continue in OOB techniques by setting a BIOS Future Settings variable based on the hot-key selection at block 318. Setting the BIOS Future Settings variable can occur as described herein, such as by making a POST or PUT request on an API of the computing device. In some cases, the BIOS Future Settings variable can be otherwise transmitted to or set on the host computing device.

In some optional cases, after the UEFI variable has been set at block 316 and the BIOS Future Settings variable has been set at block 318, the host computing device can be rebooted at block 320. Rebooting the host computing device at block 320 can include transmitting a signal from the remote computing device that, when received by the host computing device, causes the host computing device to reboot. After rebooting, the host computing device will boot, causing the BIOS to read the hot-key selection as set in the BIOS Future Settings variable, which will cause the BIOS to update its BIOS setting(s) based on the BIOS configuration instructions that are present in the UEFI variable.

In cases where the computing device is not rebooted automatically at block 320, the computing device will be prepared to boot into the new configuration whenever the computing device is next booted.

Figure 4:
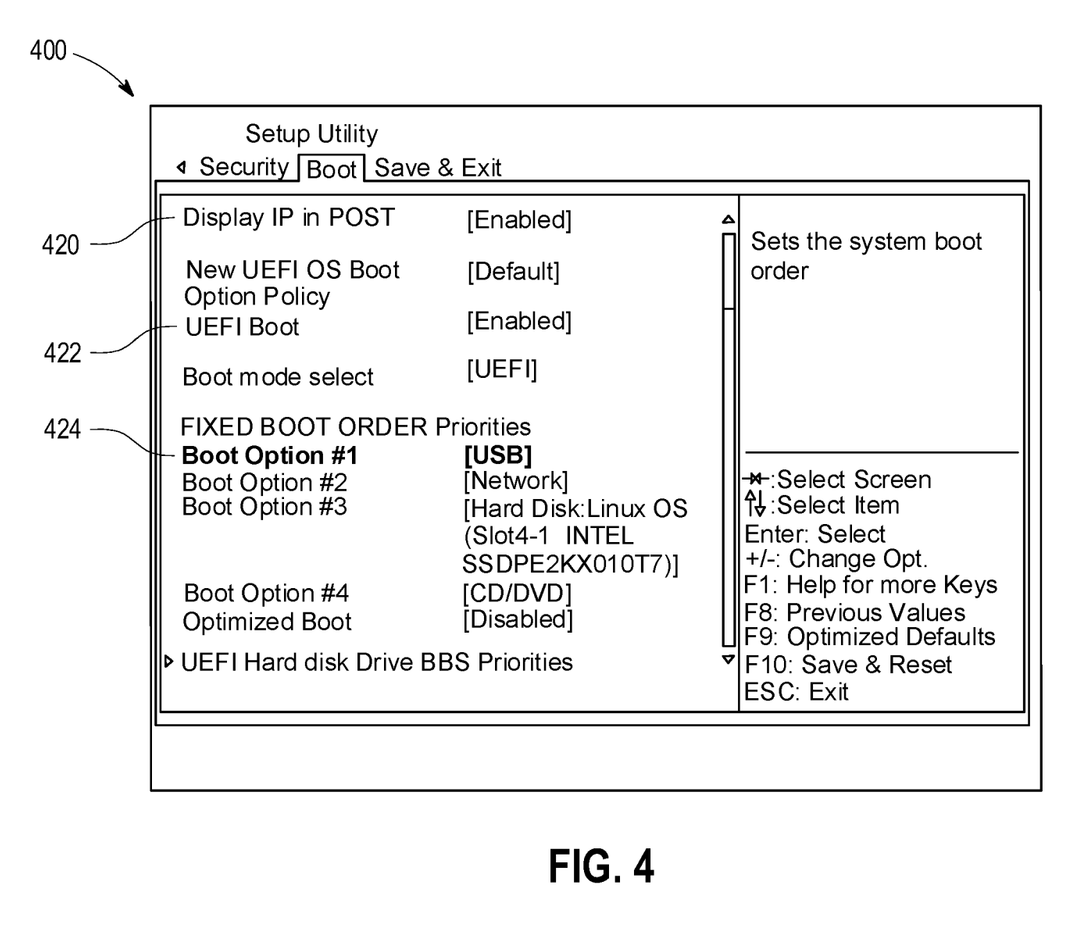
FIG. 4 is a diagram depicting an example BIOS setup utility showing a set of BIOS settings, according to certain aspects of the present disclosure.

FIG. 4 is a diagram depicting an example BIOS setup utility 400 showing a set of BIOS settings 420, 422, 424, according to certain aspects of the present disclosure. BIOS setup utility 400 can run on any suitable computing device, such as computing device 102 of FIG. 1.

The BIOS setup utility 400 is depicted as a screen containing a number of BIOS settings, such as setting 420, setting 422, and setting 424. Other screens containing other BIOS settings can be accessed by pressing the appropriate keys on an input device. Likewise, by pressing the appropriate keys, the user can move to and change the values associated with each BIOS setting. For example, setting 420 can be changed to enable or disable whether the internet protocol (IP) address is displayed in POST. As another example, setting 422 can be changed to enable or disable whether the computing device boots using UEFI. As another example, setting 424 can be changed to set which device to check and/or use first when booting the computing device. As currently set, the computing device would first boot from an attached USB device with a bootable operating system, if available, before looking to boot from a network location. Changing setting 424 can cause the computing device to first boot from a different device, if available. Once settings are changed, they can be saved and the computing device can be reset (e.g., rebooted) to effect the changes.

In some cases, BIOS setup utility 400 can be used to display a current configuration for the BIOS (e.g., the current BIOS settings), implement a preset configuration, or store a new configuration as a preset configuration.

In some cases, the BIOS setup utility 400 can be used to implement an existing preset configuration. In such cases, a user may depress a particular key when the BIOS setup utility 400 is open. When the BIOS setup utility 400 receives the hot-key selection (e.g., the particular key that is depressed), the BIOS setup utility 400 can automatically load the preset configuration associated with the hot-key selection. In an example, if the user depressed the "A" key, the BIOS setup utility 400 may automatically load a preset configuration containing updated values for settings 420, 422, 424. In some cases, the BIOS setup utility 400 can then automatically save and reset the computing device, although that need not always be the case.

In some cases, the BIOS setup utility 400 can be used to store a new configuration as a preset configuration. In such cases, the user may make adjustments to the various BIOS settings as desired, then save the displayed settings as a custom configuration instead of, or before, saving and resetting the computing device. For example, after making adjustments to the various BIOS settings, the user may press a designated key (e.g., F5), which can cause the BIOS setup utility 400 to prompt the user to depress or otherwise select a hot-key. The BIOS settings shown in the BIOS setup utility 400 can then be saved as a custom configuration and be associated with the selected hot-key.

Figure 5:
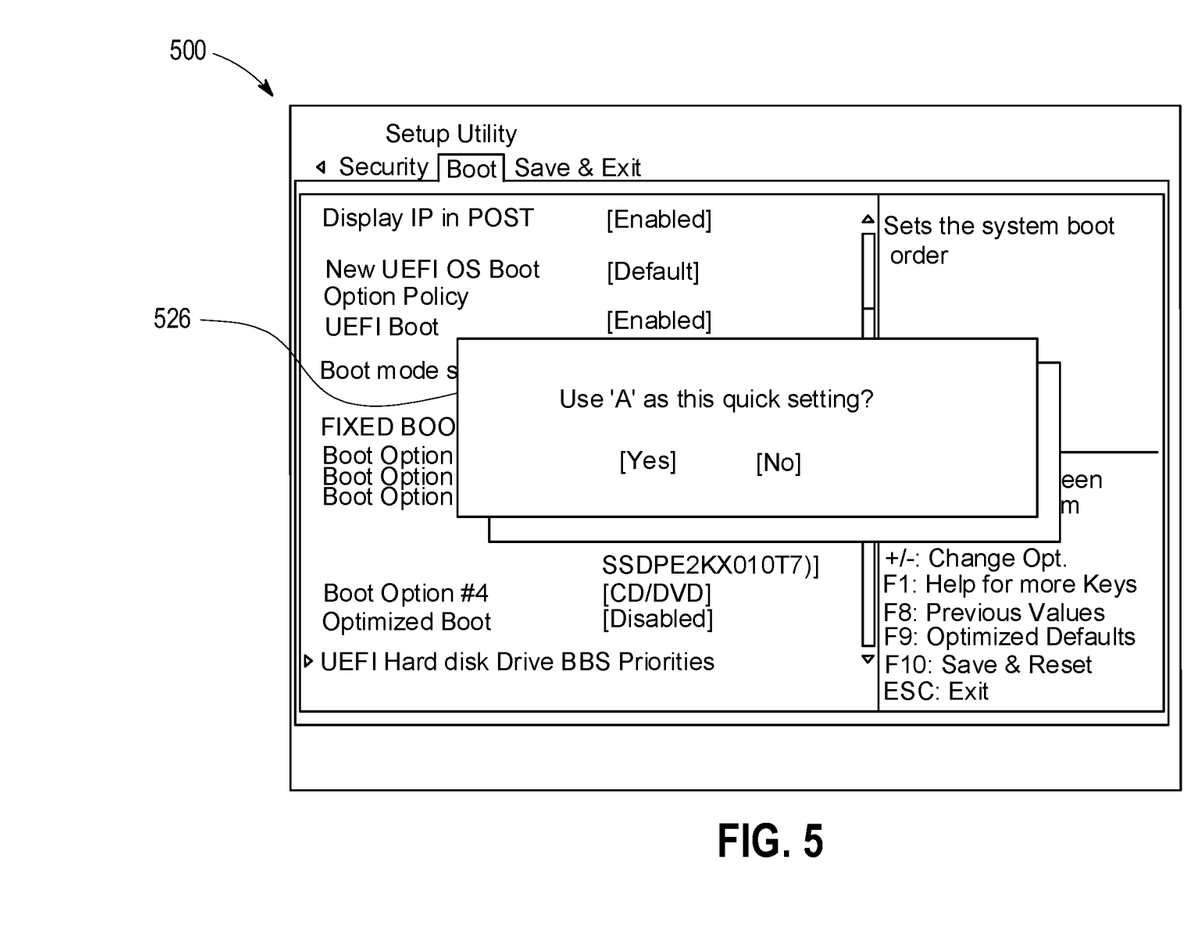
FIG. 5 is a diagram depicting an example BIOS setup utility showing a hot-key setting prompt, according to certain aspects of the present disclosure.

FIG. 5 is a diagram depicting an example BIOS setup utility 500 showing a hot-key setting prompt 526, according to certain aspects of the present disclosure. BIOS setup utility 500 can be BIOS setup utility 400 of FIG. 4 immediately after selecting a hot-key. Thus, after setting values for the desired BIOS settings and opting to save the displayed BIOS settings as a custom configuration associated, the BIOS setup utility 500 can open a hot-key setting prompt 526. The hot-key setting prompt 526 can initially request that the user depress or otherwise select a hot-key. After such selection, the hot-key setting prompt 526 can request that the user confirm the setting. Hot-key setting prompt 526 is depicted in the confirmation stage for illustrative purposes. After confirming, the BIOS settings shown in the BIOS setup utility 500 can be saved as a custom configuration and be associated with the selected hot-key.

Figure 6:
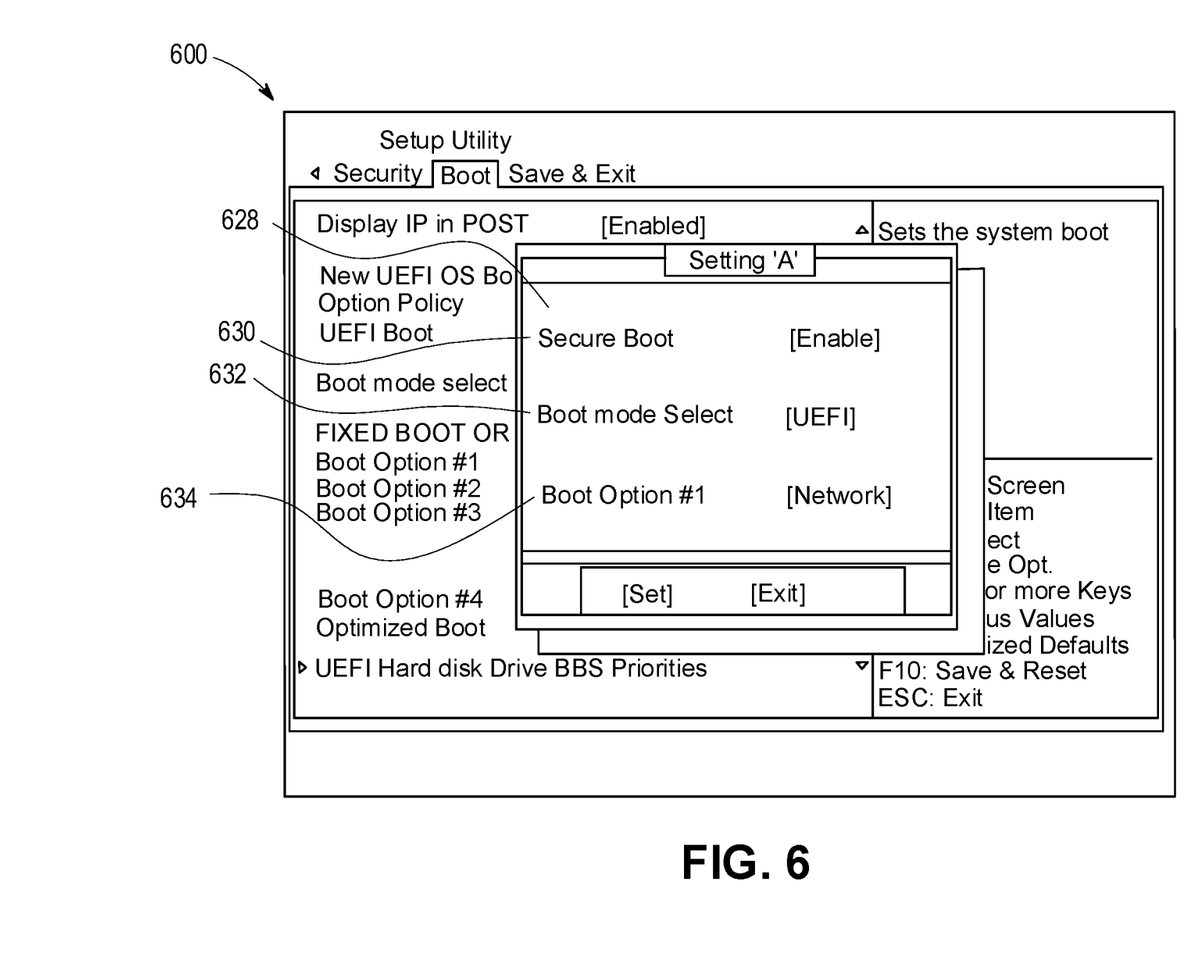
FIG. 6 is a diagram depicting an example BIOS setup utility showing a prompt for implementing a custom configuration, according to certain aspects of the present disclosure.

FIG. 6 is a diagram depicting an example BIOS setup utility 600 showing a prompt 628 for implementing a custom configuration, according to certain aspects of the present disclosure. The BIOS setup utility 600 can be any suitable BIOS setup utility, such as BIOS setup utility 400 of FIG. 4. In the example depicted in FIG. 6, the prompt 628 has appeared after the user has depressed the "A" hot-key. Upon receiving the hot-key selection, the BIOS setup utility 600 has accessed the custom configuration associated with the hot-key selection and displayed it in the prompt 628. In some cases, the entire custom configuration can be displayed, however that need not always be the case. In some cases, only the BIOS settings that are different from the current BIOS settings or the BIOS settings currently shown in the BIOS setup utility 600 are depicted.

In the example of FIG. 6, the prompt 628 displays the settings 630, 632, 634 that are included in or that will be updated by the custom configuration. For example, setting 630 is indicating that a secure boot mode is enabled, setting 632 is indicating that the boot mode is to be UEFI, and setting 634 is indicating that the computing device should first attempt to boot from the network.

In some cases, such as depicted in FIG. 6, the prompt 628 can be in the form of a request for confirmation. In such an example, the custom configuration would only be implemented if the user actively approves the change, such as by selecting the "[Set]" command, or similar, in the prompt 628. In such an example, the user may be able to cancel, and thus not implement the custom configuration, by selecting the "[Exit]" command, or similar. In other cases, however, the prompt 628 can be in the form of an informational prompt 628, in which case the prompt 628 solely indicates to the user that the custom configuration has or will be applied, without giving an option to cancel.

While the BIOS setup utility 600 is depicted as using a prompt 628 to confirm setting a custom configuration, that need not always be the case. In some cases, providing a hot-key selection can automatically cause the BIOS settings to be updated in the BIOS setup utility 600 without further prompt.

In some cases, setting the custom configuration can automatically cause the BIOS setup utility 600 to save and reboot the computing device, although that need not always be the case. In some cases, setting the custom configuration can automatically cause the BIOS setup utility 600 to save the updated BIOS settings but not yet reboot. In some cases, setting the custom configuration can cause the BIOS setup utility 600 to update the BIOS settings as displayed in the BIOS setup utility 600, but not yet save them or reboot.

Figure 7:
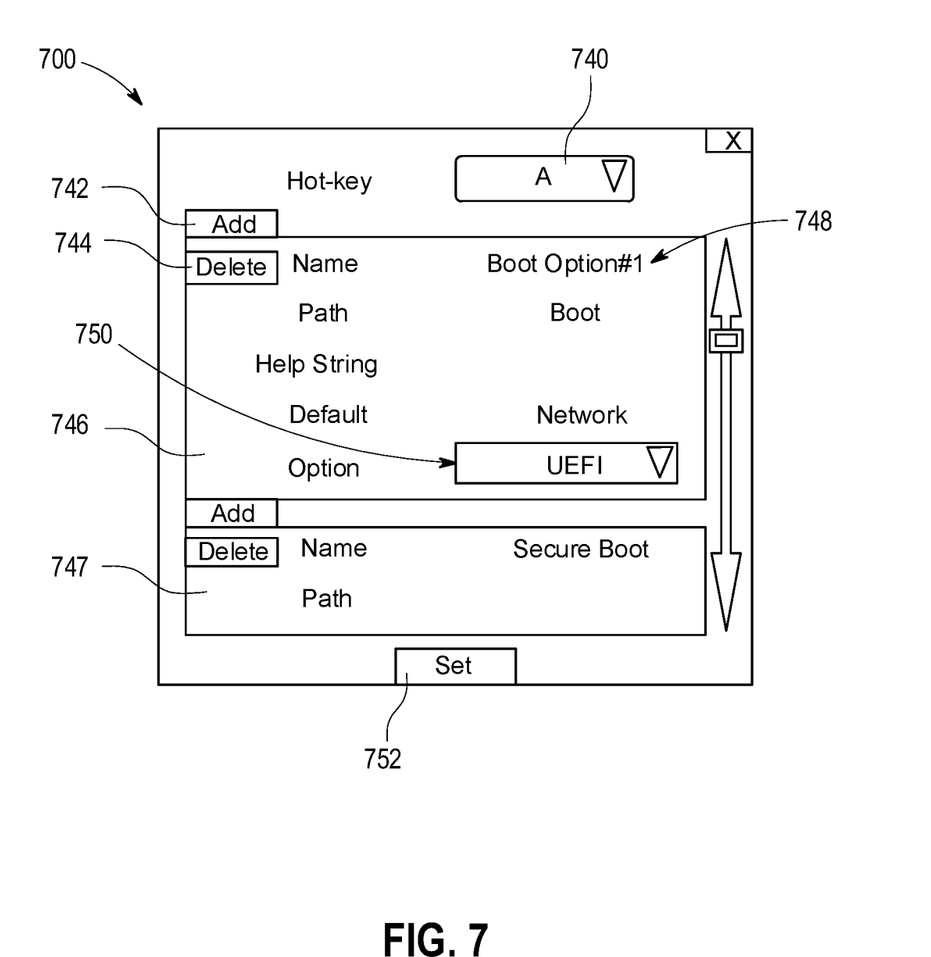
FIG. 7 is a diagram depicting a window of an example remote BIOS setting system running on an operating system, according to certain aspects of the present disclosure.

FIG. 7 is a diagram depicting a window 700 of an example remote BIOS setting system running on an operating system, according to certain aspects of the present disclosure. The remote BIOS setting system can run on any suitable remote computing device, such as remote computing device 112 of FIG. 1.

When the remote BIOS setting system is started or when the user selects an option to create or edit a custom configuration, window 700 can be displayed. Within window 700, the user can select a hot-key to use from drop-down menu 740. The drop-down menu 740 can be automatically populated with all available hot-keys (e.g., any available hot-key or any unused hot-key). In some cases, selection of a hot-key in drop-down menu 740 can update the window 700 to present the custom configuration associated with that particular hot-key.

Window 700 can include a number of BIOS settings 746, 747 that can be updated by the user. Each BIOS setting 746, 747 can include information about the setting (e.g., a name 748) and a value 750 for the setting. Other information about the setting can be provided. As an example, BIOS setting 746 can have a name 748 that is "Boot Option #1" and can include additional information, such as a path (e.g., an indication of the menu hierarchy of this setting) that is "Boot," a help string (e.g., a string explaining the purpose of the attribute or other help text associated with the attribute) that is "Sets the system boot order," a default value that is "Network," and an option (e.g., a value 750) that is "UEFI."

In some cases, window 700 can include one or more add buttons 742 and/or delete buttons 744 to add or remove BIOS settings 746, 747 from the configuration being set.

Once the user has finished setting up the desired custom configuration for the given hot-key, the user can select the "Set" button, which can cause the remote computing device to set the hot-key selection (e.g., in the BIOS Future Settings variable of the host computing device), set the UEFI variable (e.g., with the BIOS configuration information necessary to implement the desired custom configuration), and initiate a reboot of the host computing device.

Figure 8:
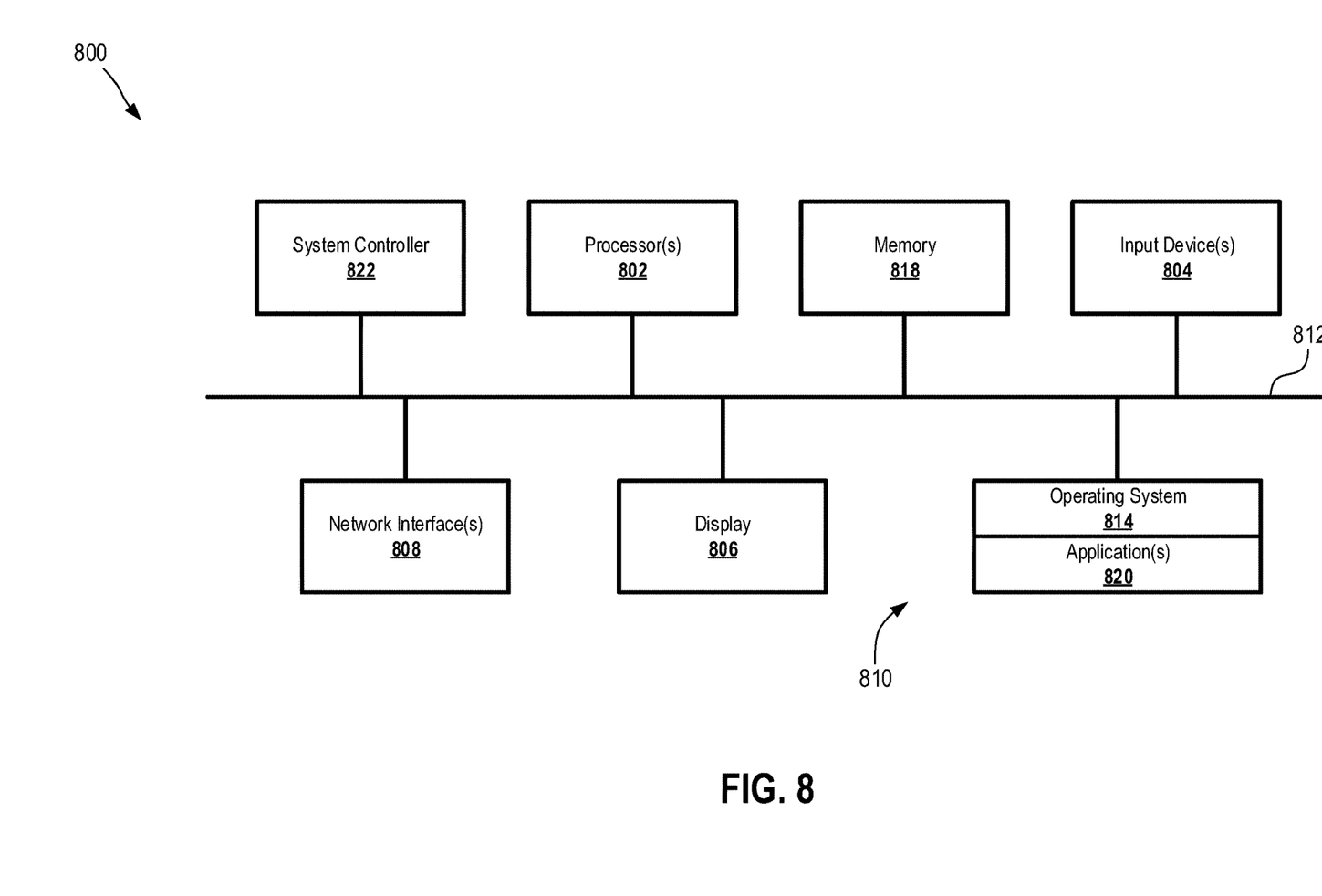
FIG. 8 is a block diagram of an example system architecture for implementing features and processes of the present disclosure.

FIG. 8 is a block diagram of an example system architecture 800 for implementing features and processes of the present disclosure, such as those presented with reference to processes 200 and 300 of FIGS. 2 and 3, respectively. The architecture 800 can be used to implement a server, a user device, a computing device (e.g., computing device 102 or remote computing device 112 of FIG. 1), or any other suitable device for performing some or all of the aspects of the present disclosure. The architecture 800 can be implemented on any electronic device that runs software applications derived from compiled instructions, including without limitation personal computers, servers, smart phones, electronic tablets, game consoles, email devices, and the like. In some implementations, the architecture 800 can include one or more processors 802, one or more input devices 804, one or more display devices 806, one or more network interfaces 808, and one or more computer-readable mediums 810. Each of these components can be coupled by bus 812.

Display device 806 can be any known display technology, including but not limited to display devices using Liquid Crystal Display (LCD) or Light Emitting Diode (LED) technology. Processor(s) 802 can use any known processor technology, including but not limited to graphics processors and multi-core processors. Input device 804 can be any known input device technology, including but not limited to a keyboard (including a virtual keyboard), mouse, track ball, and touch-sensitive pad or display. In some cases, audio inputs can be used to provide audio signals, such as audio signals of an individual speaking. Bus 812 can be any known internal or external bus technology, including but not limited to ISA, EISA, PCI, PCI Express, NuBus, USB, Serial ATA or FireWire.

Computer-readable medium 810 can be any medium that participates in providing instructions to processor(s) 802 for execution, including without limitation, non-volatile storage media (e.g., optical disks, magnetic disks, flash drives, etc.) or volatile media (e.g., SDRAM, ROM, etc.). The computer-readable medium 810 (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 810 can include various instructions for implementing operating system 814 and applications 820 such as computer programs. The operating system 814 can be multi-user, multiprocessing, multitasking, multithreading, real-time and the like. The operating system 814 performs basic tasks, including but not limited to: recognizing input from input device 804; sending output to display device 806; keeping track of files and directories on computer-readable medium 810; controlling peripheral devices (e.g., storage drives, interface devices, etc.) which can be controlled directly or through an I/O controller; and managing traffic on bus 812. Computer-readable medium 810 can include various instructions for implementing firmware processes, such as a BIOS. Computer-readable medium 810 can include various instructions for implementing any of the processes described herein, including but not limited to, at least processes 200 and 300 of FIGS. 2 and 3, respectively.

Memory 818 can include high-speed random access memory and/or non-volatile memory, such as one or more magnetic disk storage devices, one or more optical storage devices, and/or flash memory (e.g., NAND, NOR). The memory 818 (e.g., computer-readable storage devices, mediums, and memories) can include a cable or wireless signal containing a bit stream and the like. However, when mentioned, non-transitory computer-readable storage media expressly exclude media such as energy, carrier signals, electromagnetic waves, and signals per se. The memory 818 can store an operating system, such as Darwin, RTXC, LINUX, UNIX, OS X, WINDOWS, or an embedded operating system such as VxWorks.

System controller 822 can be a service processor that operates independently of processor 802. In some implementations, system controller 822 can be a baseboard management controller (BMC).

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computing device to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computing device. Generally, a processor will receive instructions and data from a read-only memory or a random access memory or both. The essential elements of a computing device are a processor for executing instructions and one or more memories for storing instructions and data. Generally, a computing device will also include, or be operatively coupled to communicate with, one or more mass storage devices for storing data files. Such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computing device having a display device such as a CRT (cathode ray tube) or LCD (liquid crystal display) monitor for displaying information to the user and a keyboard and a pointing device such as a mouse or a trackball by which the user can provide input to the computing device.

The features can be implemented in a computing system that includes a back-end component, such as a data server, or that includes a middleware component, such as an application server or an Internet server, or that includes a front-end component, such as a client computing device having a graphical user interface or an Internet browser, or any combination thereof. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an application programming interface (API). An API can define one or more parameters that are passed between a calling application and other software code (e.g., an operating system, library routine, function) that provides a service, that provides data, or that performs an operation or a computation.

The API can be implemented as one or more calls in program code that sends or receives one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, and the like.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A computer-implemented method, comprising:
   receiving current configuration information for a BIOS firmware associated with a computing device via a network interface, wherein the current configuration information is based on a plurality of BIOS settings;
   displaying the plurality of BIOS settings using the current configuration information on an additional computing device;
   receiving user input indicative of one or more updated settings and a hot-key selection on the additional computing device, wherein each of the one or more updated settings is associated with a respective one of the plurality of BIOS settings;
   initiating a connection with a baseboard management controller (BMC) of the computing device using the network interface;
   transmitting the hot-key selection to the BMC of the computing device; and
   generating and storing custom configuration information usable to apply the one or more updated settings when the hot-key selection is received by the computing device, wherein the custom configuration information is user-created custom configuration information; and
   transmitting the custom configuration information to the BMC of the computing device, wherein the hot-key selection is received by the BMC in the form of an API command to update a BIOS Future Setting of the computing device, wherein after the computing device is rebooted, the BIOS receives the hot-key selection from the BIOS Future Setting.

2. The method of claim 1, further comprising opening a BIOS setup utility on the computing system, wherein displaying the plurality of BIOS settings occurs in the BIOS setup utility, and wherein the custom configuration information is stored in a memory accessible by the BIOS firmware.

3. The method of claim 2, further comprising:
presenting a prompt indicating the one or more updated settings and the hot-key selection; and
receiving a confirmation in response to presentation of the prompt, wherein generating and storing the custom configuration information occurs in response to receiving the confirmation.

4. The method of claim 1, wherein generating and storing the custom configuration information includes generating BIOS configuration instructions, and wherein transmitting the custom configuration information to the computing device includes setting a Unified Extensible Firmware Interface (UEFI) variable associated with the computing device using the BIOS configuration instructions.

5. The method of claim 1, wherein transmitting the hot-key selection includes setting a Future BIOS Settings variable using the hot-key selection.

6. The method of claim 1, further comprising transmitting a reboot signal, wherein the reboot signal, when received by the computing device, initiates a reboot of the computing device.

7. A system, comprising:
one or more data processors; and
a non-transitory computer-readable storage medium containing instructions which, when executed on the one or more data processors, cause the one or more data processors to perform operations including:
receiving current configuration information for a BIOS firmware associated with a computing device via a network interface, wherein the current configuration information is based on a plurality of BIOS settings;
displaying the plurality of BIOS settings using the current configuration information on an additional computing device;
receiving user input indicative of one or more updated settings and a hot-key selection on the additional computing device, wherein each of the one or more updated settings is associated with a respective one of the plurality of BIOS settings;
initiating a connection with a baseboard management controller (BMC) of the computing device using the network interface;
transmitting the hot-key selection to the BMC of the computing device; and
generating and storing custom configuration information usable to apply the one or more updated settings when the hot-key selection is received by the computing device, wherein the custom configuration information is user-created custom configuration information; and
transmitting the custom configuration information to the BMC of the computing device, wherein the hot-key selection is received by the BMC in the form of an API command to update a BIOS Future Setting of the computing device, wherein after the computing device is rebooted, the BIOS receives the hot-key selection from the BIOS Future Setting.

8. The system of claim 7, wherein the instructions, when executed on the one or more data processors, cause the one or more data processors to perform: opening a BIOS setup utility on the computing system, wherein displaying the plurality of BIOS settings occurs in the BIOS setup utility, and wherein the custom configuration information is stored in a memory accessible by the BIOS firmware.

9. The system of claim 8, wherein the instructions, when executed on the one or more data processors, cause the one or more data processors to perform:
presenting a prompt indicating the one or more updated settings and the hot-key selection; and
receiving a confirmation in response to presentation of the prompt, wherein generating and storing the custom configuration information occurs in response to receiving the confirmation.

10. The method of claim 7, wherein generating and storing the custom configuration information includes generating BIOS configuration instructions, and wherein transmitting the custom configuration information to the computing device includes setting a Unified Extensible Firmware Interface (UEFI) variable associated with the computing device using the BIOS configuration instructions.

11. The system of claim 7, wherein transmitting the hot-key selection includes setting a Future BIOS Settings variable using the hot-key selection.

12. The system of claim 7, wherein the instructions, when executed on the one or more data processors, cause the one or more data processors to perform: transmitting a reboot signal, wherein the reboot signal, when received by the computing device, initiates a reboot of the computing device.

* * * * *